United States Patent [19]

Ross

[11] Patent Number: 5,759,333
[45] Date of Patent: Jun. 2, 1998

[54] SAFETY GLOVE BAG AND METHOD OF MAKING SAME

[75] Inventor: Kurt D. Ross, Atlanta, Ga.

[73] Assignee: Grayling Industries, Inc., Alpharetta, Ga.

[21] Appl. No.: 621,528

[22] Filed: Mar. 25, 1996

Related U.S. Application Data

[60] Division of Ser. No. 329,402, Oct. 27, 1994, Pat. No. 5,536,077, which is a continuation-in-part of Ser. No. 293,187, Aug. 19, 1994, Pat. No. 5,553,933.

[51] Int. Cl.⁶ .................................................. B08B 15/00
[52] U.S. Cl. ...................... 156/308.4; 312/1; 493/194; 493/195
[58] Field of Search ...................... 156/251, 308.2, 156/308.4, 309.6; 312/1, 3–6; 493/193–197

[56] References Cited

U.S. PATENT DOCUMENTS

| 4,790,803 | 12/1988 | Roen | 493/195 |
| 5,429,707 | 7/1995 | Smith | 156/251 |
| 5,496,251 | 3/1996 | Cheng | 493/196 |

*Primary Examiner*—Daniel Stemmer
*Attorney, Agent, or Firm*—Kennedy, Davis & Kennedy

[57] ABSTRACT

An apparatus for use in removing hazardous material I from an elongated pipe P comprises an elongated upper work section 41 from which a plurality of in-line lower debris collection and disposal bags 47 depend. The upper work section and the bags are made of flexible sheet material. The upper work section has a bottom formed with a plurality of in-line chutes 52 that extend between adjacent bags. A plurality of gloves 48 are mounted to the upper work section. Upon wrapping and securing the upper work section about a pipe with the chutes inclined therefrom, insulation may be manually worked from the pipe and channeled by the chutes into the bags for collection and storage. A method of manufacturing the apparatus from two continuous webs of flexible material is also disclosed.

2 Claims, 8 Drawing Sheets

SAFETY GLOVE BAG AND METHOD OF MAKING SAME

REFERENCE TO RELATED APPLICATION

This is a division of application Ser. No. 08/329,402 filed Oct. 27, 1994 now U.S. Pat. No. 5,536,077, which is a continuation-in-part of application Ser. No. 08/293,187 filed Aug. 19, 1994, now U.S. Pat. No. 5,553,933.

TECHNICAL FIELD

This invention relates generally to safety glove bags, and particularly to safety glove bags of the type used to remove hazardous material from a pipe, and to methods of producing such glove bags.

BACKGROUND OF THE INVENTION

Before the hazardous nature of asbestos was fully appreciated, asbestos was widely used to insulate pipes in buildings. It is of course now realized that exposure to asbestos, and particularly to airborne asbestos fibers and dust, creates a significant health hazard. The awareness of the dangers inherent in the presence of asbestos has led to the removal of asbestos insulation, even when undamaged. As an example, quite often a potential purchaser of a building or house will require removal of all asbestos before consummating the purchase. Both federal and state laws require extraordinary protection for workers engaged in the removal of asbestos containing materials. To afford such protection without seriously hampering the work effort, several devices and systems have been used.

Today glove bags are widely used in safely removing asbestos insulation form pipes. One of the first such glove bags was that one known as the Asbebag which is described in United Kingdom Patent No. 1,567,270 and Canadian Patent No. 1,188,191. It was made of two sheets of transparent plastic material with side gussets and welded seams. The top of the bag had front and back flaps that were placed about a length of insulated pipe and held together with a sliding clasp fastener. These flaps extended laterally from the main body of the bag to provide extensions that were secured to sections of the pipe that straddle the section to be stripped. Mittens extended into the interior of the bag. Mating Velcro strips and covering plastic flaps were provided to seal off a bottom portion of the bag after the pipe has been cleaned and the stripped debris or lagging has been collected therein. A second generation Asbebag of Petro Zarkos shown in United Kingdom Patent Application No. 2,157,822A, was of similar shape, both being the shape such like that of a T-shirt formed with two sheets of plastic welded together at their edges.

Another, design glove bag of Natale is shown in U.S. Pat. No. 4,626,291. It is made of a length of polyethylene lay-flat tubing with a sealed bottom and open top flaps that are wrapped about a pipe.

More recently the asbestos abatement industry has adopted glove bags of a design that has a number of individual debris collection chambers or pouches that depend downwardly from an elongated upper section or manifold that is wrapped about a pipe. Such a bag is shown in U.S. Pat. No. 4,901,743 of Hittler and is referred to as an extended run safety glove bag. This type glove bag has the advantage of enabling a long section of pipe to be stripped of insulation with a single bag where, otherwise, several bags would have to be individually mounted or a single bag mounted and remounted a number of times along successive portions of the pipe section.

Though the foregoing glove bags have been commercially successful, their specially designed shapes have resulted in substantial waste of plastic material and other manufacturing inefficiencies. And though the Natale design is simple, being made from a length of lay flat tubing without lateral flaps or sleeves, it has been difficult to bunch and seal to pipe lagging. Its bottom seal has also been susceptible to breaching when loaded with stripped lagging and water used in the stripping process.

Another problem with these glove bags relates to the handling of long sections of insulation. After stripping, long sections of insulation are difficult to maneuver within the glove bags down into the debris collection bags. The length of stripped insulation relative to the size of the openings of the debris collection bags and the cramped working area surrounding the piping limit the length of insulation that is removable for placement directly in the debris collection bags. Therefore, stripped long sections must often be further cut into pieces before insertion into the debris collection bags, or shorter lengths must be cut initially. Either procedure requires additional time to an already time consuming, laborious task.

It thus is seen that a need remains for a safety glove bag for use in removing hazardous material from a pipe of simplified construction and manufacturing efficiency. Accordingly, it is to the provision of such that the present invention is primarily directed.

SUMMARY OF THE INVENTION

In a preferred form of the invention an apparatus for use in removing hazardous material from an elongated pipe has an upper work section comprised of a generally rectangular sheet of flexible material that has a centrally located opening. A lower debris collection and disposal bag depends from the upper work section about the opening. Gloves are also mounted to the upper work section. By wrapping and securing the upper work section about a pipe with opposite ends thereof drawn upwardly thereto aside the opening, the work section is configured into the shape of a funnel for funneling debris worked from the pipe down into the debris collecting and disposal bag.

Alternatively, several openings are formed in a row in the rectangular sheet about which several debris collection and disposal bags depend. Support means are provided for supporting the upper portion to shape it into a row of in tandem funnels for funneling debris into the bags.

The apparatus is made by cutting one or more holes in a generally rectangular sheet of flexible material such as plastic, mounting gloves to the sheet, and mounting bags to the sheet about the holes.

In another preferred form of the invention an apparatus for use in removing hazardous material from an elongated pipe comprises an elongated upper work section from which a plurality of in-line, lower, debris collection and disposal bags depend. The upper work section and the bags are made of flexible sheet material. The upper work section has a bottom formed as in-line chutes that extend between adjacent bags. Work gloves are mounted to the upper work section. Upon wrapping and securing the upper work section about a pipe with the chutes inclined with respect to the pipe, insulation may be manually worked from the pipe and channeled by the chutes into the bags for collection and storage. The apparatus is preferably manufactured in pairs by layering two elongated sheets of flexible material together, sealing the sheets centrally along an elongated serpentine seal line in a repetitive pattern of transverse lines substantially joined by oblique lines, and cutting the sheets apart along the seal.

DETAILED DESCRIPTION

Figure 1:
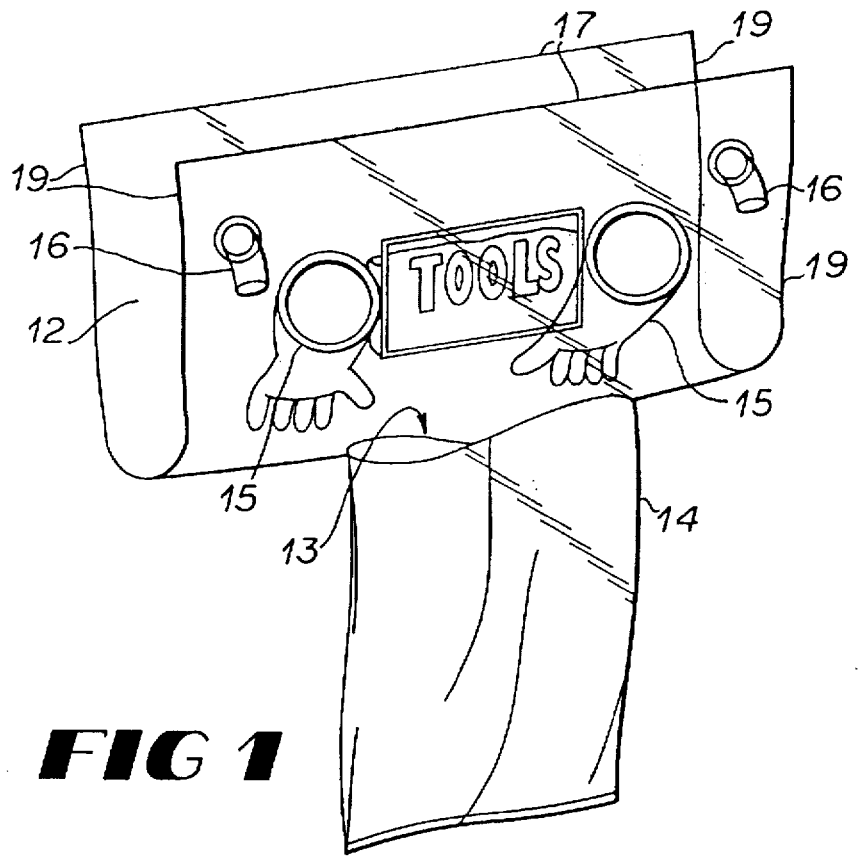
FIG. 1 is a perspective view of apparatus of the invention in a preferred form shown configured for mounting to a pipe.

Referring now in more detail to the drawing, there is shown in FIGS. 1–4 an apparatus for removing hazardous, asbestos insulation or lagging from a pipe which comprises a rectangular sheet of flexible, transparent, plastic material 12 shown folded into a U-shaped trough preparatory to being mounted to a pipe. The sheet 12 has a centrally-located cut-out hole 13 about the periphery of which is heat sealed an open end of a transparent, plastic, debris collection and disposal bag 14. Alternatively the hole 13 may be to one side to facilitate receipt of intact elongated sections of lagging. A pair of gloves 15 is heat sealed to the sheet 12 above the hole 13 as is a tool pouch and access ports 16 for sealingly receiving water hoses and vacuum lines.

Figure 2:
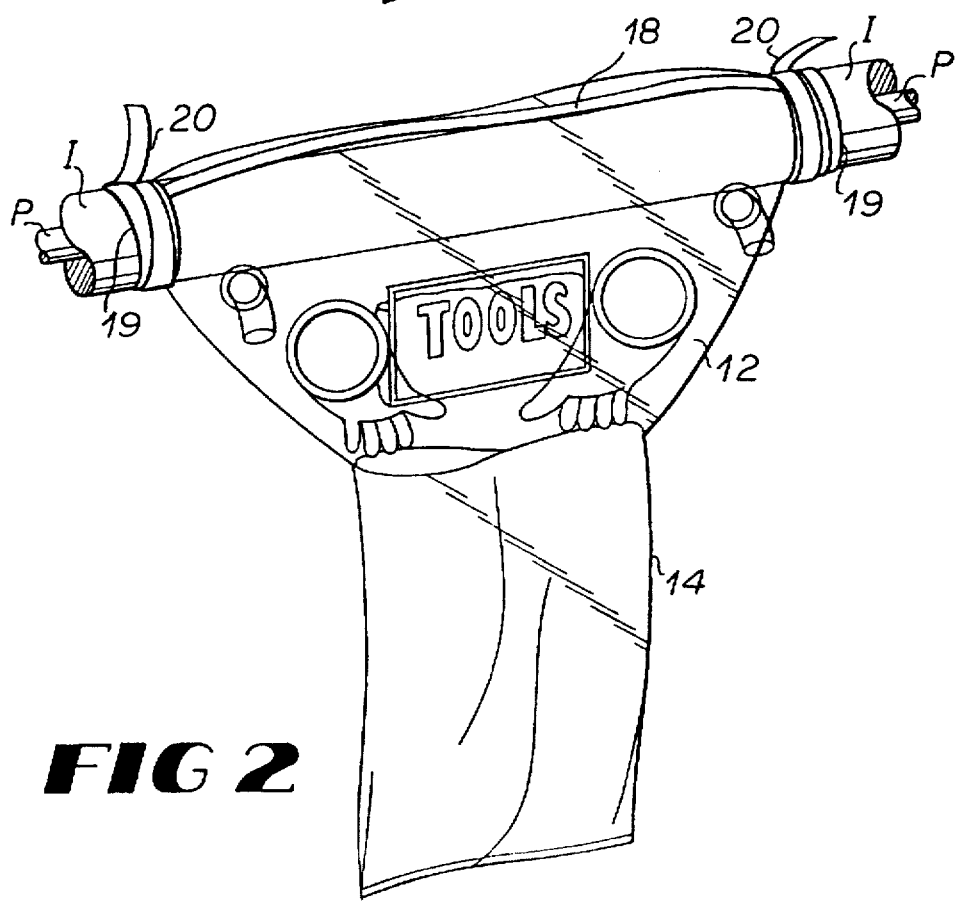
FIG. 2 is a perspective view of the apparatus of FIG. 1 shown mounted to a pipe preparatory to stripping.

With reference to both FIGS. 1 and 2, the apparatus is mounted to a pipe P covered with a layer of insulation or lagging I that is to be stripped. To do this the upper, opposed edges 17 of the sheet are looped over the top of the insulated pipe and sealed together with a length of tape 18. The two opposed side edges 19 are then drawn upwardly, snugly about the insulated pipe and sealed thereto with strips of tape 20. This results in the sheet 12 now being configured into the shape of a funnel as shown in FIG. 2. The apparatus is now ready for use in manually stripping the section of pipe located therein with the sheet 12 now providing an upper work section of the apparatus and the bag providing a lower debris collection and disposal section.

Figure 3:
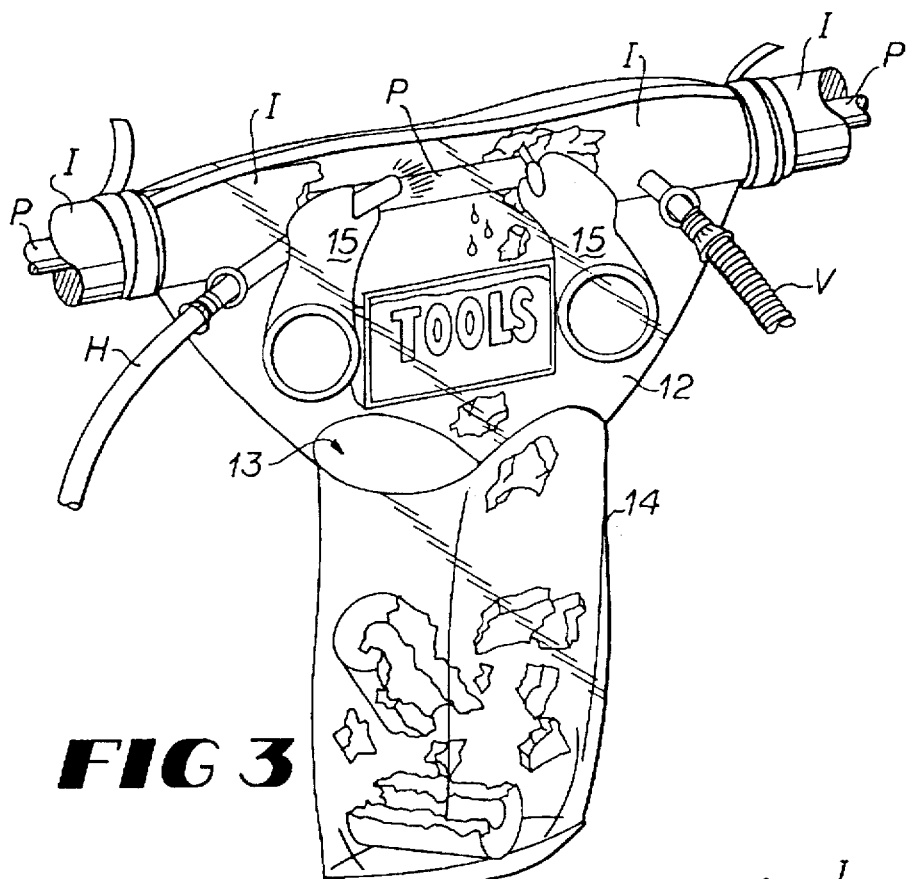
FIG. 3 is a perspective view of the apparatus of FIGS. 1 and 2 shown with the pipe being stripped of insulation.
Figure 4:
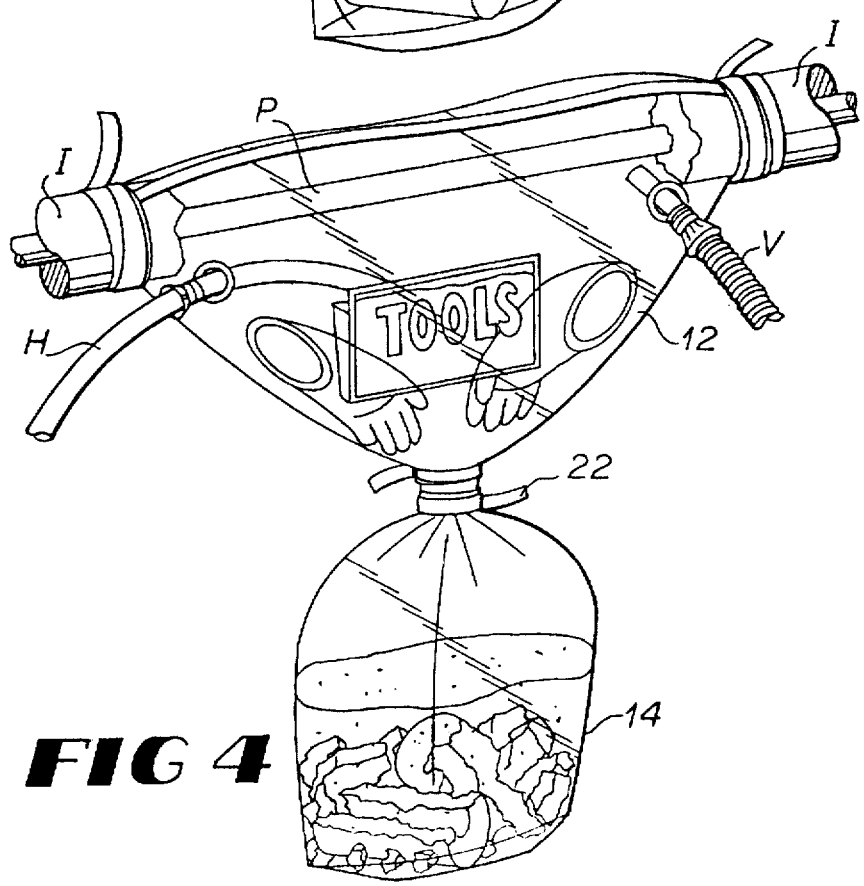
FIG. 4 is a view of the apparatus of FIGS. 1–3 following completion of the stripping operation and with its debris collection and disposal bag tied off.
Figure 5:
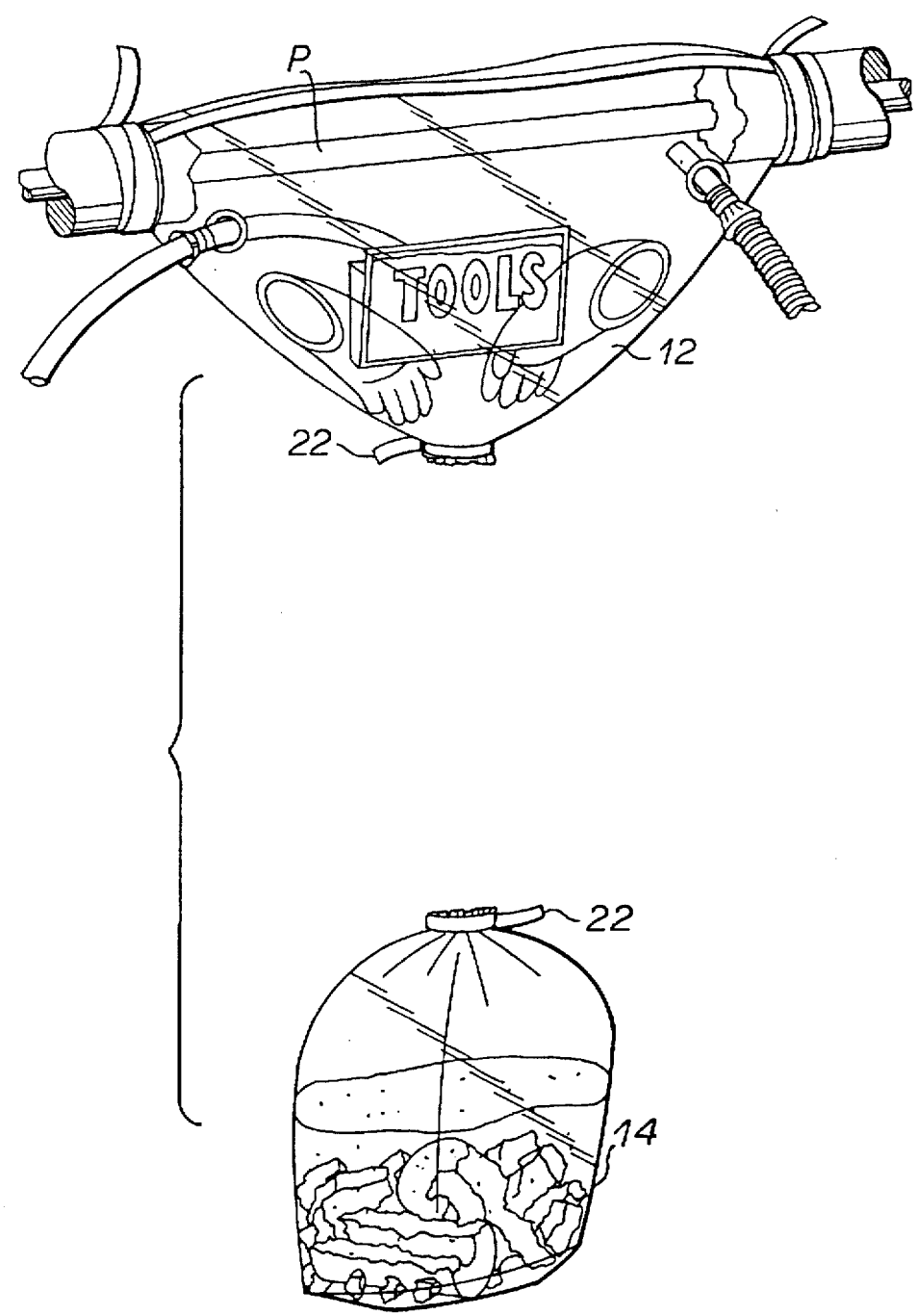
FIG. 5 is a perspective view of the apparatus of FIGS. 1–4 with the bag separated from the remainder of the apparatus.
Figure 6:
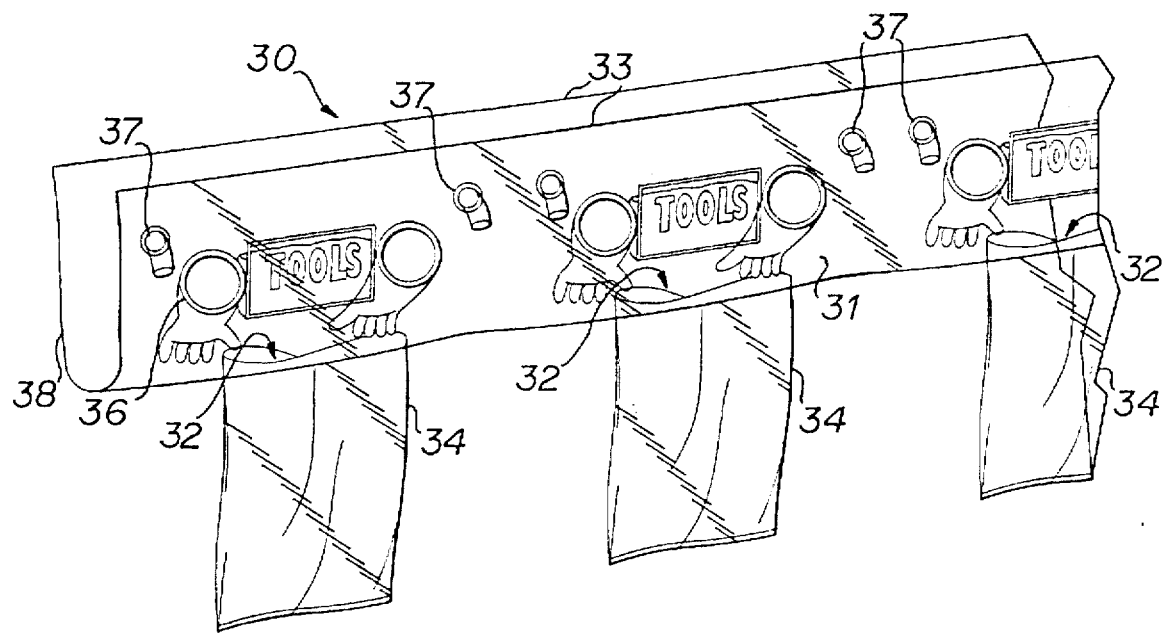
FIG. 6 is a perspective view of another preferred embodiment of the invention shown configured for mounting to a pipe.

In FIG. 3 the apparatus is shown while the pipe P is being stripped of its insulation I. With an operator's unshown hands inserted in the gloves 15 his right hand here cuts away the insulation while his left hand aims a water hose H at the pipe while a vacuum is applied via vacuum line V. As this is done pieces of stripped insulation or lagging are washed down the funnel-shaped upper section and into the debris collection and disposal bag 14. Finally, as shown in FIGS. 4 and 5, the top of the bag is tightly bundled closed and secured tightly with a wrap of tape 22 and then severed free from the upper section. The upper work section is then removed.

With reference next to FIGS. 6–9 another preferred form of the invention is shown as an extended run type glove bag. Here the apparatus 30 is seen to comprise an elongated, rectangular sheet of flexible, transparent, plastic material 31, although an end portion is shown cut away in each figure for simplicity and clarity of illustration. A series or row of holes 32 is cut in the sheet midway between its elongated side edges 33, spaced from the sheet ends 38. Again, debris collection and disposal bags 34 of transparent, plastic construction are heat sealed, in tandem, to the sheet 31 about the holes 32. Gloves 36, a tool pouch and access ports 37 are mounted to the sheet 31 above each hole 32.

Figure 7:
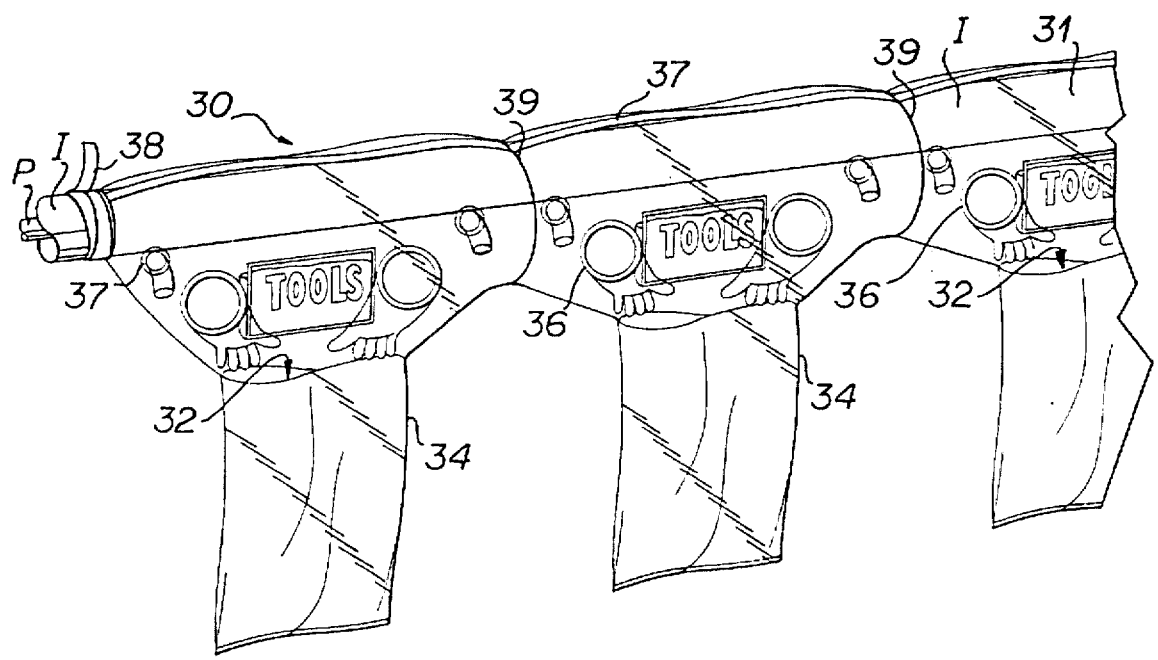
FIG. 7 is a perspective view of the apparatus of FIG. 6 shown mounted to a pipe preparatory to stripping.
Figure 8:
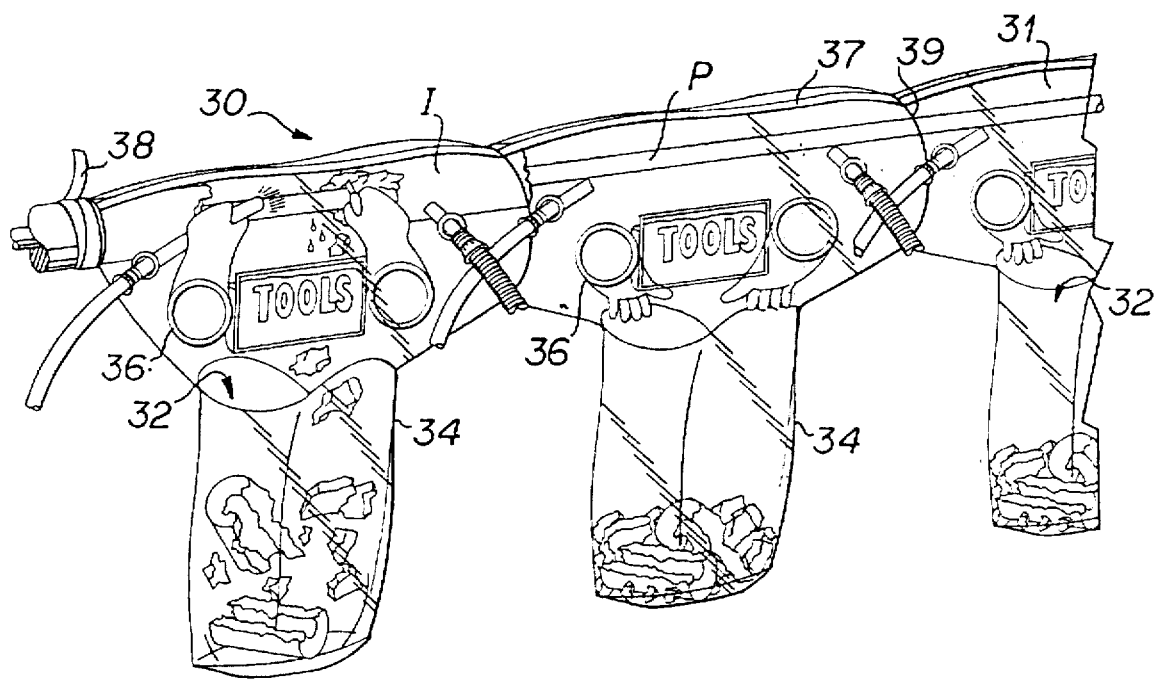
FIG. 8 is a perspective view of the apparatus of FIGS. 6–7 shown with the pipe being stripped of insulation.
Figure 9:
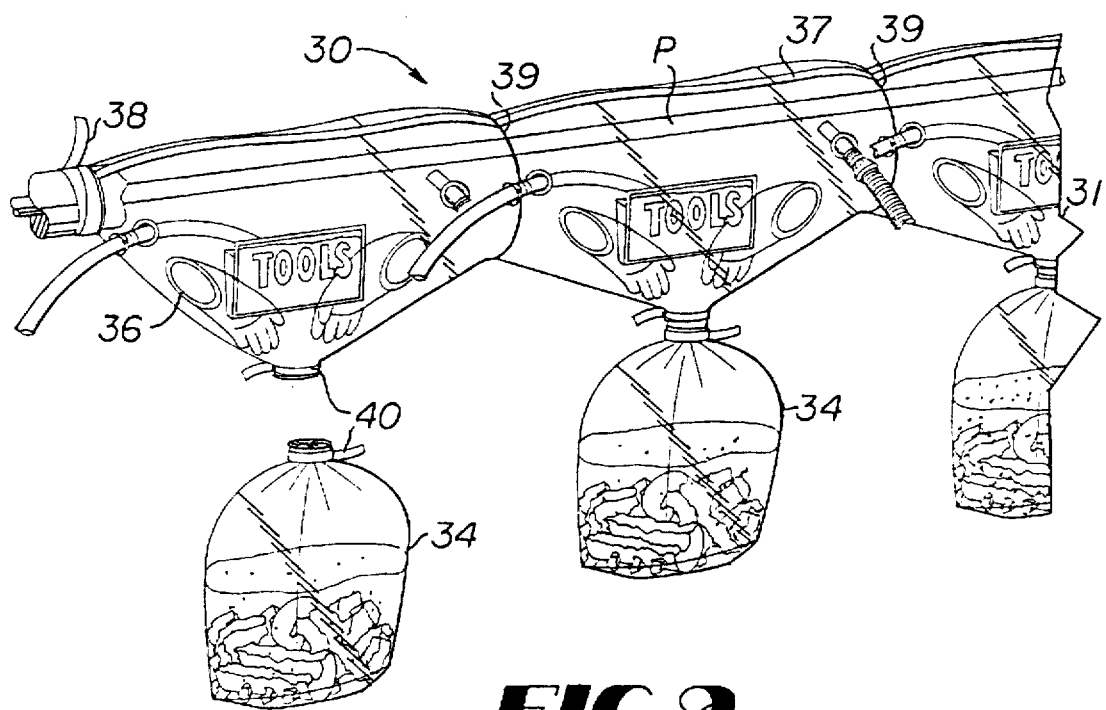
FIG. 9 is a perspective view of the apparatus of FIGS. 6–8 with its disposal bags filled and tied off and in the process of being separated.

The apparatus 30 is mounted to a pipe P with jacketed insulation I as shown in FIG. 7 by bringing together elongated edges 33 of the sheet 31 above the pipe and sealing them together with tape 37. The relatively short ends 38 of the sheet 31 are sealed to the insulation I with tape 38. Tie lines 39 are then tied about the sheet 31 midway between adjacent holes 32 of lengths that are sufficiently short to elevate the bottom of the sheet between the holes above the holes but which are sufficiently long so that there is still substantial space between the sheet and insulated pipe all along the interior of the apparatus. In this manner the entire section of the pipe within the apparatus is accessible for stripping. Also, with the opposite ends of the sheet drawn and sealed to the insulation and with intermediate bottom portions of the sheet drawn upwardly aside the holes 32, the sheet assumes the shape of an array of in tandem funnels as shown in FIG. 7.

With the apparatus mounted to the insulated pipe as shown in FIG. 7, the insulation I may be stripped from the entire section of the Pipe P that is inside the apparatus 30. This is shown being completed in FIG. 8. The stripped lagging and water used to do this are funnelled from the upper work section of the apparatus above the holes 32 into the debris collection and storage bags 34. The bags are then sealed with tape 40 and cut free from the sheet as shown being done in FIG. 9. The remaining upper work portion of the apparatus may then be removed.

Though the use of tie lines 39 is preferred in shaping the extended run version into a series of funnels, such may also be done by gathering or bunching the sheet in these areas and then applying the tape 37. If desired, the sheet 31 can have serrated or undulating edges 33 that are brought together and taped to reduce bulk created by the avoid the gathering and bunching in those areas above the pipe.

Figure 10:
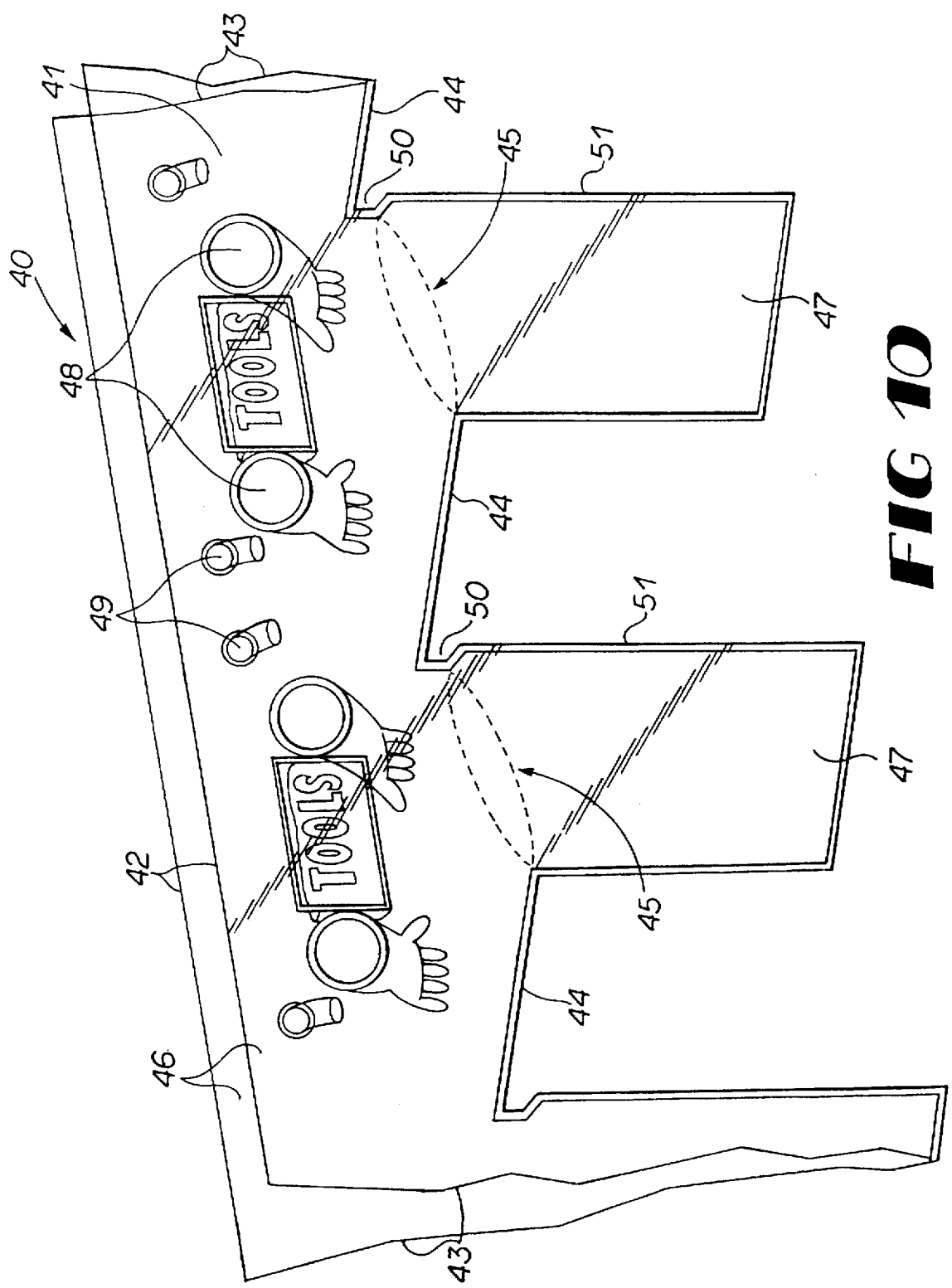
FIG. 10 is a perspective view of another preferred embodiment of the invention shown configured for mounting to a pipe.
Figure 11:
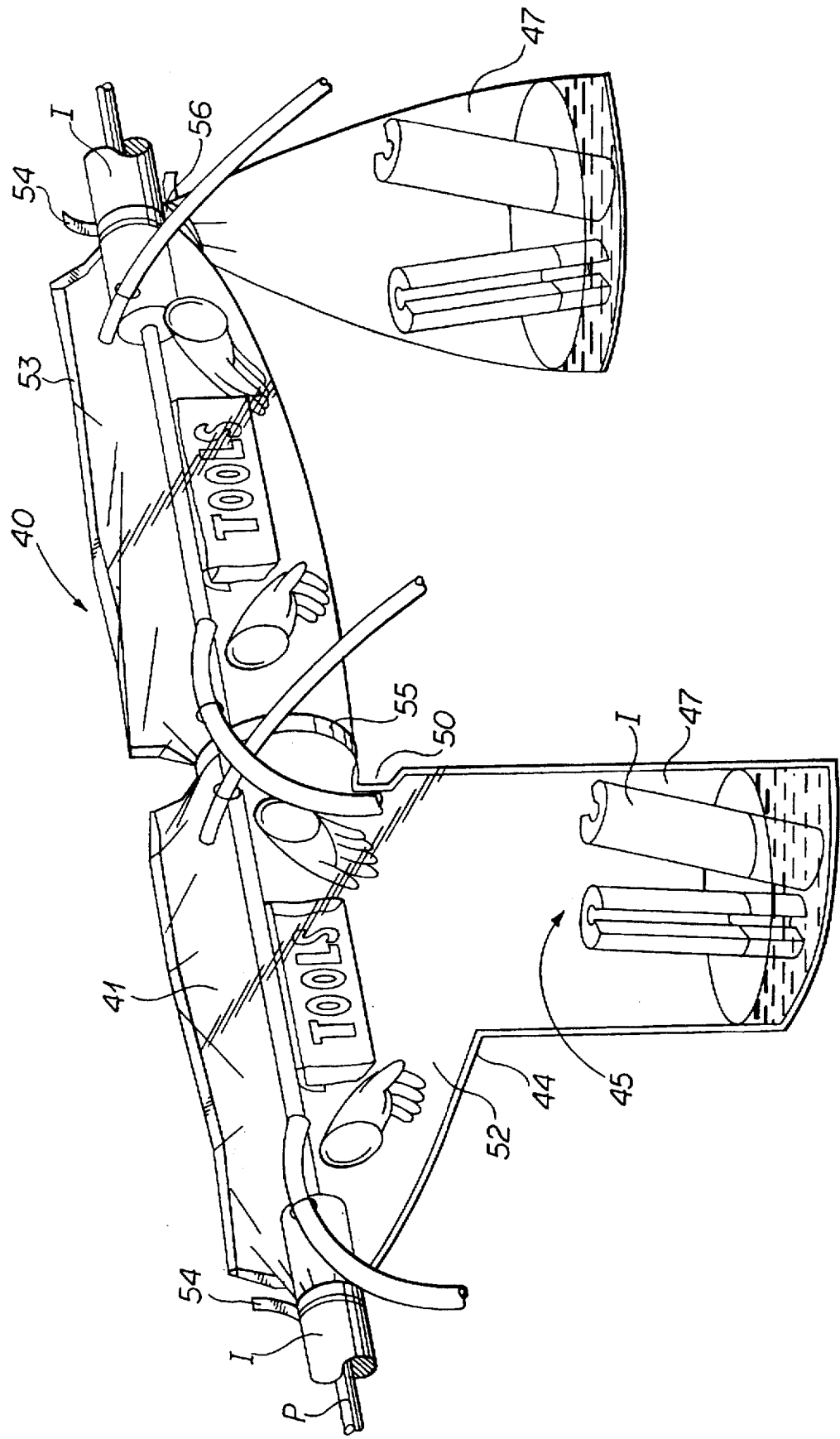
FIG. 11 is a perspective view of the apparatus of FIG. 10 shown mounted to an insulated pipe with two of its debris collection and disposal bags holding lengthy sections of stripped insulation and water and with one of the bags tied off in preparation for being separated.
Figure 12:
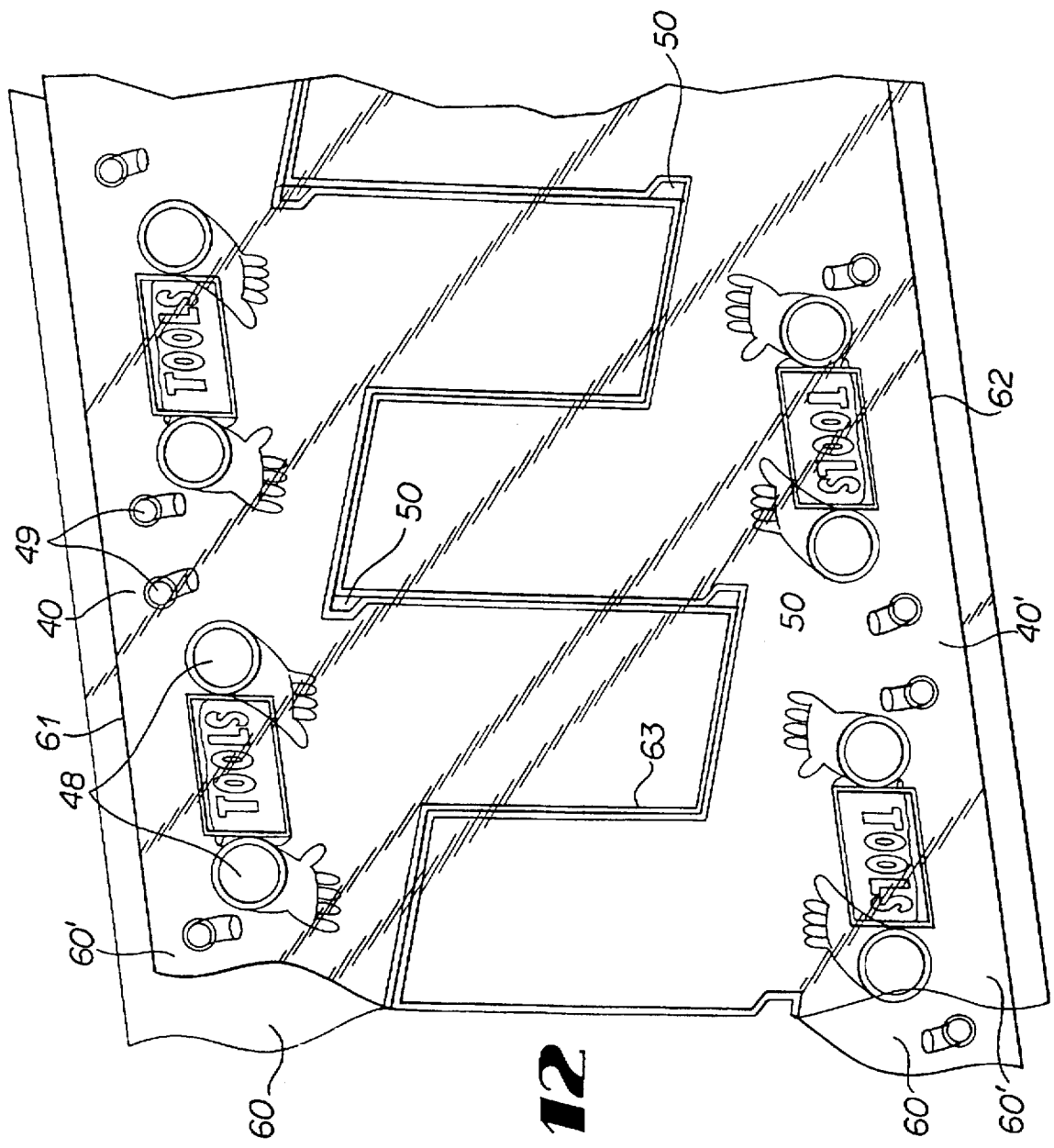
FIG. 12 is a perspective view of two of the apparatuses of FIG. 10 shown in the process of being manufactured.

With reference to FIGS. 10–12, another preferred form of the extended run or in-line type glove bag is shown. Here an apparatus 40 comprises an elongated, upper work section 41 having elongated upper edges 42, side edges 43, elongated bottom edges 44 tapered with respect to the upper edges 42 and openings 45. As opposed to the centrally located cut-out hole 13 of the embodiment of FIG. 1, the openings 45 here are offset to one side of the bottom edges 44. A series or row of debris collection and disposal bags 47 is formed unitarily here with the upper work section 41 as opposed to being heat sealed thereto. The bags 47 extend from the bottom edges 44 of the upper work section 41 about the openings 45. The upper work section 41 and the bags 47 are formed out of two sheets of flexible, transparent, plastic material 46 on a continuous run basis with the side edges 43 formed, not necessarily here as shown, but dependent upon the number of in-line disposal bags desired.

Pairs of gloves 48 are heat sealed to the upper work section 41. As opposed to the pair of gloves 15 being centrally located above the bag 14 as with the apparatus of FIG. 1, each pair of gloves 48 is preferably heat sealed offset from each of the bags 47. Tool pouches and access ports 49 are also mounted to the upper work section 41 in similar arrangement relative to the gloves 36, as discussed above in FIG. 1. A notch 50 is formed on a side edge 51 of each bag 47 at the junction of the side edge 51 and bottom edge 44 of the upper work section 41.

With reference to FIG. 11, the apparatus 40 is shown mounted to a pipe P having jacketed insulation I for insulation removal. The left section of the apparatus 40 is shown in its working position with insulation I removed from the pipe P and deposited in its bag 47. The right section of the apparatus is shown with its bag 47 tied off in preparation for being separated, as discussed below.

The apparatus 40 is mounted to the pipe P by bringing together the elongated upper edges 42 of the upper work section 41 above the pipe and sealing them together with tape 53. The side edges 43 of the upper work section 41 are bundled and tightly secured to the insulation I with tape 54. This creates an increase in the angle or degree of the downward taper of the bottom edge 44, as shown with respect to the left section of the apparatus. Thus, an in-line chute 52 is formed in the lower portion of the upper work section 41 adjacent the opening 45 of the bag 47. A tie line 55 is tied loosely about the upper work section 41 adjacent the notch 50 between the two bags 47. As illustrated by its left section, the apparatus 40 is thereby configured into the shape of skewed chutes as opposed to the funnel shown in FIG. 2.

With the apparatus 40 mounted to the insulated pipe P shown in FIG. 11, lengthy strips of insulation I may be stripped from the entire section of the pipe P that is inside it. In stripping the insulation, a section of it is cut lengthwise along the length of the insulated pipe and stretched open along the cut thereby releasing it from the pipe. One end of the section of insulation, which is distal to the bottom edge 44, is lowered toward the bag 47 through the chute 52. Upon releasing the other end, the section of insulation falls into the bag 47. Lengthy sections of the stripped insulation may thus now be easily maneuvered within the upper work section 41 through the chutes 52 and from there flushed into the bags 47 without the necessity of having to be subdivided. The shape of the chutes 52 funnels long sections of stripped insulation I into the bags 47. In FIG. 11 the apparatus is shown with only two bags for simplicity of illustration and to show how its ends are closed. Usually, however, the apparatus would have more than two bags with the slope of the intermediate chutes being approximately as shown in FIG. 10.

After stripping of all the insulation within the upper work section 41 is complete, the material surrounding each of the openings 45 is gathered, twisted and sealed with tape 56, as so illustrated in the right section of the apparatus 40 of FIG. 11. During the wrapping of the tape 56 about the openings 45, the notches 50 provide holding places for the tape 56 which facilitates efficient sealing of the bags 47. The bags 47 are then detached from the upper work section 41 by cutting just above the tape 56. The upper work section 41 is removed from the cleaned pipe P by removing the tie lines 55, the tape 54 and the tape 53.

The apparatus 40 is preferably manufactured as shown in FIG. 12 from two generally rectangular sheets 60 and 60' of flexible, elongated plastic material that are layered together. Pairs of gloves 48, tool pouches, and access ports 49 are heat sealed to the sheet 60' near the upper edge 61 and lower edge 62 of the sheet 60'. With the sheets 60 and 60' being conveyed as two continuous webs, a heat seal 63 is made between the two sheets in a serpentine pattern of transverse parallel lines substantially joined by oblique lines, and with the heat seal line 63 also defining the notches 50. After heat sealing, a cut is formed in the middle of the heat seal 63 thereby separating the sheets into an upper apparatus 40 and a lower apparatus 40'. Thus, virtually all of the two sheets 60 and 60' are utilized in the production of the apparatuses 40 and 40' with almost no resulting waste of material.

It thus is seen that apparatuses for removing hazardous insulation material from insulated pipes are now provided of very simple and economic construction and which may be used in a highly efficient manner. It should be understood however that the embodiments just described merely illustrate principles of the invention in its preferred forms and that many modifications may be made thereto without departure from the spirit and scope of the invention as set forth in the following claims.

I claim:

1. In a method of manufacturing a pair of safety glove bags having a plurality of chutes and a plurality of debris collection and disposal bags, the improvement comprising the steps of:

layering two elongated sheets of flexible material together;

sealing the sheets together along an elongated serpentine seal line in a repetitive pattern of transverse lines joined by oblique lines; and cutting the sheets apart along the seal line.

2. The method of claim 1 wherein the sheets are sealed along an elongated serpentine seal line in a repetitive pattern of two parallel, transverse lines substantially joined by two oblique, offset, parallel lines.

* * * * *